Aug. 31, 1954
C. V. COMBEST
2,688,069
STEAM GENERATOR
Filed July 20, 1953
2 Sheets-Sheet 2
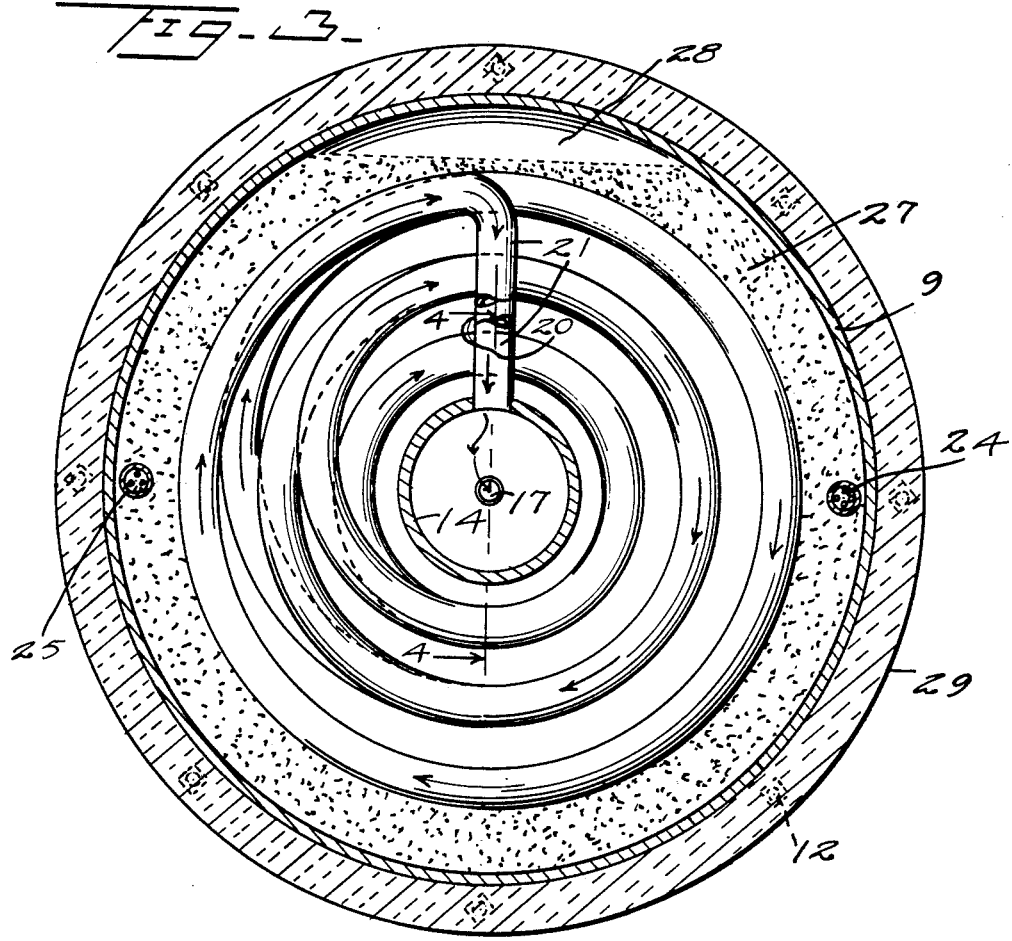
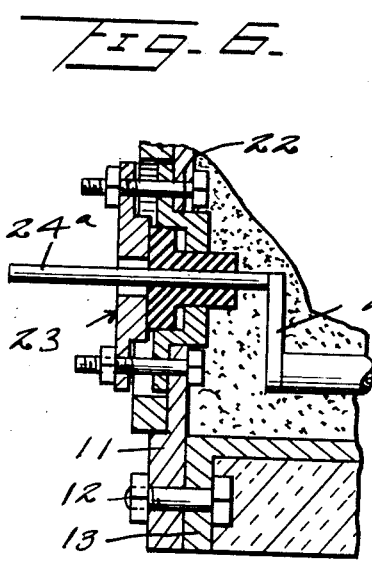
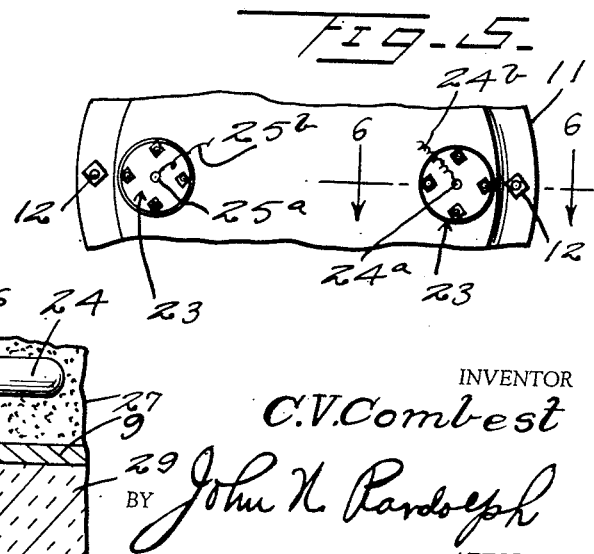
INVENTOR
C.V.Combest
BY John N. Randolph
ATTORNEY

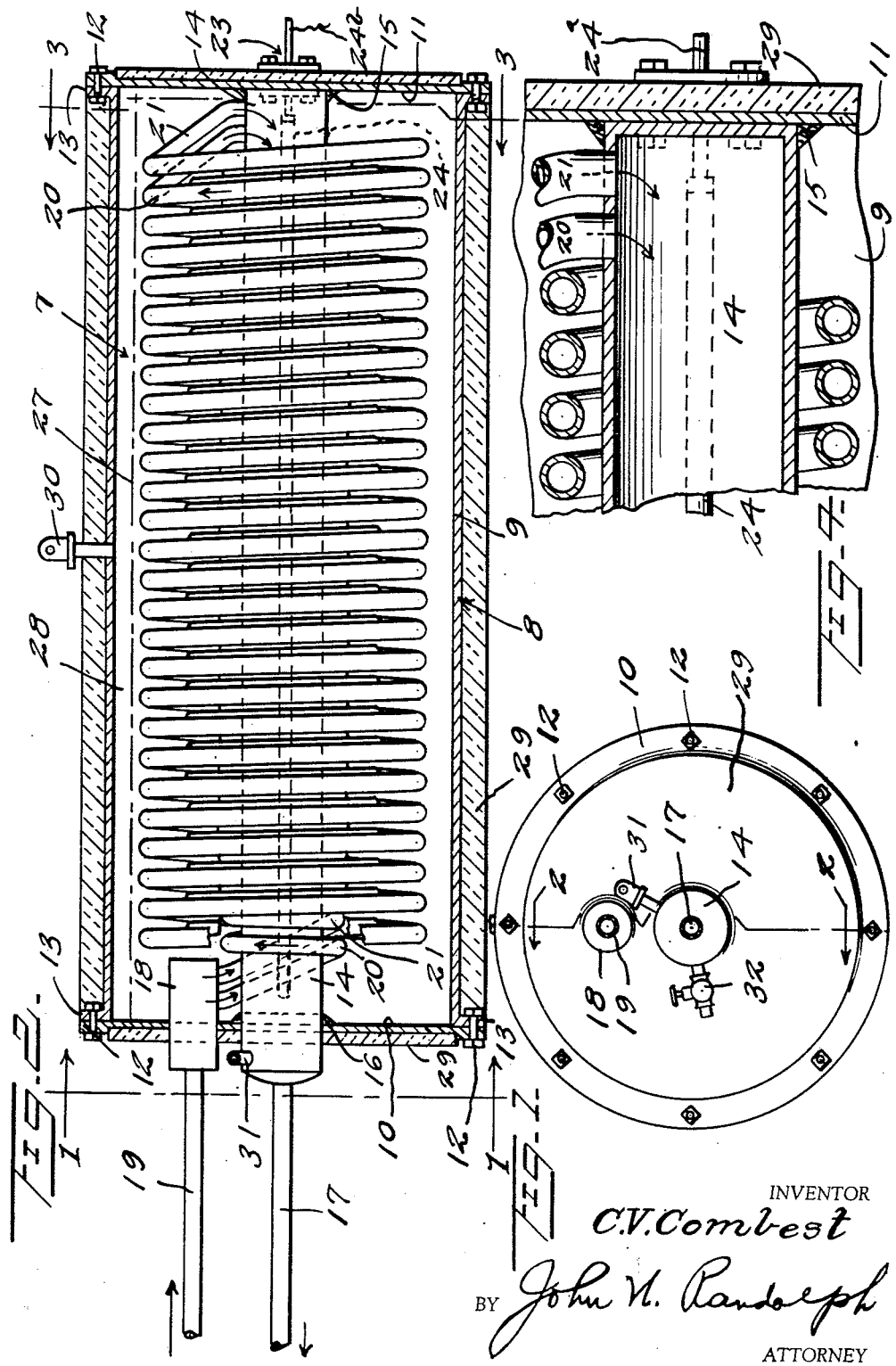

Patented Aug. 31, 1954

2,688,069

UNITED STATES PATENT OFFICE 2,688,069

STEAM GENERATOR

Clark V. Combest, Cave Junction, Oreg.

Application July 20, 1953, Serial No. 368,987

5 Claims. (Cl. 219—38)

1

This invention relates to a novel steam generator of the water tube type and constitutes a continuation in part of my prior pending application for steam generator, filed May 13, 1953, Serial No. 354,792.

The present invention like the invention of my aforementioned prior application is capable of operating rapidly and efficiently on the principle of a flash type steam generator and has a high degree of thermal efficiency stemming from the fact that none of the generated heat can escape to the atmosphere.

A primary object of the present invention is to provide a steam generator employing a material as a heating element which will substantially eliminate internal pressure within a shell of the generator except for thermal expansion, thus enabling steam of a very high temperature to be produced with safety.

A further object of the invention is to provide a steam generator employing a material as a heating element which is light in weight, inexpensive, which is a good conductor of electricity and possesses good thermal conductive characteristics.

A further object of the invention is to provide a generator which due to the unique heating element utilized and which substantially eliminates the problem of internal pressure in the generator shell for producing high temperature steam, will enable the shell to be produced in numerous ways and which will eliminate the need for carefully sealing the shell to withstand high pressure.

A further object of the invention is to provide a steam generator using a heating element which is substantially noncombustible, which cannot be melted and which will not rust.

Various other objects and advantages of the invention will hereinafter become more fully apparent from the following description of the drawings, illustrating a presently preferred embodiment thereof, and wherein:

Figure 1 is an end elevational view of the steam generator with certain of the parts shown in cross section, taken substantially along a plane as indicated by the line 1—1 of Figure 2;

Figure 2 is a longitudinal sectional view, partly in side elevation, taken substantially along a plane as indicated by the line 2—2 of Figure 1;

Figure 3 is an enlarged cross sectional view, partly in end elevation, taken substantially along a plane as indicated by the line 3—3 of Figure 2;

Figure 4 is an enlarged fragmentary longitudinal sectional view, taken substantially along a plane as indicated by the line 4—4 of Figure 3;

Figure 5 is a fragmentary end elevational view looking from right to left of Figure 2, and Figure 6 is an enlarged fragmentary sectional view taken substantially along a plane as indicated by the line 6—6 of Figure 5.

Referring more specifically to the drawings, the steam generator in its entirety comprising the invention is designated generally 7 and includes a shell or tank, designated generally 8. The shell or tank 8 includes a side wall 9 which may be cylindrical, as illustrated, or of any other cross sectional shape. The shell of tank 8 also includes end walls 10 and 11 which are secured by fastenings 12 to outturned end flanges or lugs 13 of the side wall 9.

An elongated steam chamber 14 extends longitudinally through the shell 8 and is preferably disposed axially thereof. The inner side of the end wall 11 is provided with a socket 15 for receiving and supporting a closed end of the steam chamber 14. The other end of said chamber extends outwardly through an internally flanged opening 16 of the end wall 10 and is supported thereby. A restricted steam conduit 17 communicates with and extends from said last mentioned exposed end of the steam chamber 14.

A header 18 is mounted in and extends through the end wall 10 in radially spaced relationship to the steam chamber 14; however, said header or its equivalent could be mounted elsewhere in the shell 8, as for example in the side wall 9. The discharge end of a water supply conduit 19 is connected to and opens into the interior of the outer end of the header 18. Complementary ends of two tubes 20 and 21 are connected to the portion of the header 18 disposed within the shell 8. Said tubes 20 and 21 are coiled around the chamber 14 lengthwise thereof and within the shell 8, back and forth any desired number of times to provide two or more radially spaced laps. The opposite discharge ends of the tubes 20 and 21, which preferably extend inwardly from an outer lap of the coiled tubes, are connected to and discharge into the chamber 14 adjacent the end wall 11. The tubes 20 and 21 may be of any desired internal and external diameter but of sufficient strength to contain high temperature steam. Said tubes may be of a very small diameter for more quickly and efficiently heating liquid contained therein.

As best illustrated in Figures 5 and 6, the end wall 11 is provided with spaced openings 22 which are preferably radially spaced from and disposed on opposite sides of the socket 15. A seal 23 of electrical insulating material, preferably porcelain or pyrex, is mounted in each of the openings 22. Two electrodes 24 and 25 are mounted in and extend longitudinally of the shell 8 in laterally spaced relationship to one another and have restricted outer end portions 24a and 25a, respectively, which extend outwardly through and are supported in the insulators 23. Arms 26 may be provided for offsetting the electrodes 24 and 25 laterally with respect to their restricted outer end portions 24a and 25a, respectively and which combine with said portions or arms 26 to support the electrodes 24 and 25 in the shell 8. As clearly illustrated in Figure 6, the electrodes 24 and 25, including their portions 24a and 25a, respectively, are thus supported in electrical insulated relationship to the shell 8 by the insulators 23. Said insulators in addition seal the openings 22. The electrodes 24 and 25 may extend to adjacent the end walls 10 and 11. It will also be readily apparent that the insulators 23 could be mounted in the other end wall 10 for supporting the electrodes on said last mentioned end wall, or one of the insulators 23 could be mounted in each end wall. The shell 8 may be formed of a material which is a non-conductor of electricity.

The shell 8 is filled with graphite, as indicated at 27 in Figures 3 and 6, approximately to a level so that the tubes 20 and 21 will be completely submerged therein but so as to leave a limited space 28 above the level of the graphite 27 within the shell 8, to allow for expansion of the graphite and the tubes 20 and 21. The graphite may be in any form.

From the foregoing it will be readily apparent that water under pressure may be supplied to the header 16 through the water supply conduit 19 from which the water is in turn supplied to the tubes 20 and 21 for substantially filling said tubes. The electrodes 24 and 25 are interposed in an electric circuit, not shown, including conductor wires 24b and 25b which are connected to the outer ends of the electrode portions 24a and 25a, respectively. When the circuit of which the electrodes form a part is energized, the graphite will provide an electrical conductor for bridging the gap between the electrodes 24 and 25 and will also function as a resistance heating element. The graphite is capable of being heated to a very high temperature by the current passing therethrough, since the graphite will not melt. Accordingly, the water contained in the tubes 20 and 21 and in the chamber 14 can be rapidly heated to produce steam of a very high temperature. The space 28 will afford adequate space for the limited expansion of the graphite 27 and of the tubes 20 and 21 and chamber 14. Thus, the shell 8 will be required to withstand only very slight internal pressure thus allowing great latitude in the construction of the shell 8, both in material and design. Due to the fact that graphite is an excellent conductor of heat, the amount of current required to produce steam of a very high temperature is reduced to a minimum. This feature in conjunction with the fact that there is a minimum of heat loss, will enable the generator 7 to be operated very economically.

The high temperature at which the graphite can be maintained will make it possible for the water entering the tubes 20 and 21 to be quickly converted into steam and heated to a high temperature and pressure within the tubes and steam chamber 14, from which chamber the high pressure steam may be supplied through the conduit 17 to any source or unit where the steam is to be utilized, under suitable regulation. Obviously, a suitable thermostat, not shown, may be provided for controlling the electric circuit of the electrodes 24 and 25 for maintaining the graphite at a desired temperature.

It will also be readily apparent that the unit 7 may be utilized as a hot water heater by maintaining the graphite 27 at a temperature sufficiently low so that the water in the tubes 20 and 21 and in the steam chamber 14 will not be converted to steam.

The shell 8 is preferably covered with a heat insulating material 29 to prevent loss of heat therefrom by radiation to obtain maximum thermal efficiency. Due to the small amount of material which would be released should the shell rupture and since this material 27 is noncombustible and will not expand sufficiently to produce any appreciable internal pressure within the shell 8, it will be readily obvious that the generator 7 will be extremely safe in use.

As an additional safety feature but primarily to conform with safety regulations, the upper part of the shell is provided with a conventional blow off or safety valve 30 and a similar blow off or safety valve 31 is provided in the exposed end of the steam chamber 14. Additionally, a drainage or flush valve 32, as seen in Figure 1, is preferably provided in the exposed end of the steam chamber 14 to facilitate the draining and flushing of the system to maintain the steam chamber and tubes 20 and 21 in a clean condition. Various other forms of regulating and control valves may also be provided if deemed desirable or necessary.

Various modifications and changes are contemplated and may obviously be resorted to, without departing from the spirit or scope of the invention as hereinafter defined by the appended claims.

I claim as my invention:

1. A steam generator of the character described comprising a shell, a pair of spaced electrodes disposed within said shell, a material partially filling said shell and constituting a heating and electrical resistance element and in which said electrodes are submerged and whereby said material is heated to a high temperature by a current flowing therethrough between the electrodes, and a liquid conduit having a portion disposed within said shell and at least partially submerged in said material whereby a liquid passing through said conduit portion will be heated by said material when an electric current is passed therethrough, said heating and electrical resistance material being in a dry loose state and constituting a good conductor of electricity and heat and being noncombustible and capable of being heated to extremely high temperatures without expanding appreciably and without melting.

2. A steam generator of the character described comprising a shell, a pair of spaced electrodes disposed within said shell, a material partially filling said shell and constituting a heating and electrical resistance element and in which said electrodes are submerged and whereby said material is heated to a high temperature by a current flowing therethrough between the electrodes, and a liquid conduit having a portion disposed within said shell and at least partially submerged in said material whereby a liquid passing through said conduit portion will be heated by said material when an electric current is passed therethrough, said heating and electrical resistance material comprising graphite.

3. A generator of the character described comprising a sealed shell, spaced electrodes disposed within said shell, graphite partially filling said shell in which the electrodes are submerged, and means contained within said shell and at least partially submerged in the graphite containing a liquid to be heated by the graphite when an electric current is passed through the graphite between said electrodes, said means having an inlet end connected to a source of water supply extending into said shell and an outlet conduit for the heated liquid leading from said shell and forming an extension of an outlet end of said means.

4. A generator as in claim 3, said graphite substantially filling the shell.

5. A generator of the character described comprising a casing, a pair of electrodes disposed in said casing, graphite partially filling said casing and in which said electrodes are submerged, a liquid conduit having a portion disposed within said shell and at least partially submerged in the graphite whereby a liquid passing through said conduit portion will be heated by the graphite when an electric current is passed through the graphite between said electrodes.

References Cited in the file of this patent

UNITED STATES PATENTS

| Number | Name | Date |
|---|---|---|
| 1,539,039 | Blanding | May 26, 1925 |
| 1,693,182 | Rochester, Jr. | Nov. 27, 1928 |
| 2,036,815 | Leader | Apr. 7, 1936 |
| 2,402,899 | Knapp | June 25, 1946 |